United States Patent
Sisk

(10) Patent No.: US 9,061,599 B2
(45) Date of Patent: Jun. 23, 2015

(54) SYSTEM AND METHOD FOR OPTIMIZING THE STORING OF VEHICULAR ENERGY

(71) Applicant: Johnson Controls Technology Company, Holland, MI (US)

(72) Inventor: Brian C. Sisk, Mequon, WI (US)

(73) Assignee: Johnson Controls Technology Company, Holland, MI (US)

(*) Notice: Subject to any disclaimer, the term of this patent is extended or adjusted under 35 U.S.C. 154(b) by 0 days.

(21) Appl. No.: 14/014,163

(22) Filed: Aug. 29, 2013

(65) Prior Publication Data

US 2014/0200756 A1    Jul. 17, 2014

Related U.S. Application Data

(60) Provisional application No. 61/751,413, filed on Jan. 11, 2013, provisional application No. 61/800,168, filed on Mar. 15, 2013.

(51) Int. Cl.

| | | |
|---|---|---|
| *B60L 9/00* | (2006.01) | |
| *B60L 11/18* | (2006.01) | |
| *H02J 7/14* | (2006.01) | |

(52) U.S. Cl.
CPC .......... *B60L 11/1864* (2013.01); *Y10S 903/903* (2013.01); *Y02T 10/7005* (2013.01); *H02J 7/1423* (2013.01); *H02J 7/1446* (2013.01)

(58) Field of Classification Search
CPC ............ B60W 20/106; B60W 20/1062; B60L 11/1864; B60L 11/1861
USPC .................... 701/22; 320/101, 135, 166, 167; 180/65.29; 903/903
See application file for complete search history.

(56) References Cited

U.S. PATENT DOCUMENTS

| | | | |
|---|---|---|---|
| 7,923,951 B2 | 4/2011 | Soma et al. | |
| 8,138,720 B2 | 3/2012 | Snyder et al. | |

(Continued)

FOREIGN PATENT DOCUMENTS

| | | |
|---|---|---|
| JP | 2006306231 | 11/2006 |
| JP | 2012001168 | 5/2012 |
| JP | 2012095377 | 5/2012 |

OTHER PUBLICATIONS

Heinemann, Detlef et al., "Ultracaps in Power-Assist Application in Battery Powered Electric Vehicles—Implications on Energy". EVS 18 Berlin, 2001.

(Continued)

*Primary Examiner* — Thomas G Black
*Assistant Examiner* — Luke Huynh
(74) *Attorney, Agent, or Firm* — Fletcher Yoder P.C.

(57) ABSTRACT

A system for storing electrically a regenerative energy of a vehicle is provided. The system includes a first energy storage device, a second energy storage device, an energy regulating device coupled to the first and second energy storage devices, a source of regenerative power configured to capture a regenerative energy during a regenerative power event of the vehicle, and a control unit coupled to the energy regulating device. The control unit is configured to transfer electrical energy from the first energy storage device to the second energy storage device based on a prediction of the regenerative power event using the energy regulating device. The transfer of the electrical energy serves to reduce the electrical energy stored in the first energy storage device thereby enabling the first energy storage device to receive from the regenerative power device when the predicted regenerative power event occurs an amount of the electrical regenerative energy.

24 Claims, 11 Drawing Sheets

(56) References Cited

U.S. PATENT DOCUMENTS

| | | | |
|---|---|---|---|
| 2004/0074682 A1 | 4/2004 | Fussey et al. | |
| 2005/0284676 A1* | 12/2005 | King et al. | 180/65.3 |
| 2011/0087391 A1 | 4/2011 | Pandit et al. | |
| 2011/0257879 A1 | 10/2011 | Ishibashi | |

OTHER PUBLICATIONS

Koot, Michiel et al. "Energy Management Strategies for Vehicle Power Nets", Department of Mechanical Engineering: Technische Universiteit Eindhoven; http://www.mate.tue.nl/mate/pdfs/3113.pdf.

Koot, Michiel et al. "Energy Management in a Vehicle With a Dual Storage Power Net", Technische Universiteit Eindhoven. http://www.nt.ntnu.no/users/skoge/prost/proceedings/ifac2005/Fullpapers/04079 ; 2005.

Koot, Michiel et al. "Energy Management Strategies for Vehicle Electric Power Systems", IEEE Transactions on Vehicular Technology, vol. 54, No. 3, May 2005.

Ni, Liqin. "Energy Storage and Management for a Small Series Plug-In Hybrid Electric Vehicle", University of Nebraska—Lincoln, Electrical Engineering Theses and Dissertations; Department of Electrical Engineering. Nov. 18, 2010.

Nuijten et al. "Advanced Energy Management Strategies for Vehicle Power Nets"; http://www.mate.tue.nl/mate/pdfs/3113.pdf.

Weighall et al., "Test Requirements for 42 V Battery Systems", Science Direct; Journal of Power Sources 116 (2003), pp. 151-159.

Zhang et al., "Fuzzy Logic Controll in Regenerative Braking System for Electric Vehicles", IEEE Xplore; Jun. 6-8, 2012, pp. 588-591.

Zhiling et al., "Optimal Energy Management for a Fuel Cell Hybrid Locomotive", IEEE Xplore; Aug. 10-12, 2010, pp. 1320-1323.

International Search Report & Written Opinion for PCT Application No. PCT/US2013/077029 mailed Jan. 30, 2015.

* cited by examiner

SYSTEM AND METHOD FOR OPTIMIZING THE STORING OF VEHICULAR ENERGY

CROSS-REFERENCE TO RELATED APPLICATIONS

The present application claims priority under 35 U.S.C. §119(e) to U.S. Provisional Patent Application Ser. No. 61/751,413 filed Jan. 11, 2013, and to U.S. Provisional Patent Application Ser. No. 61/800,168 filed Mar. 15, 2013, which are incorporated herein by reference in their entirety.

BACKGROUND

The present disclosure relates generally to the field of batteries and battery modules. More specifically, the present disclosure relates to battery cells that may be used in vehicular contexts, as well as other energy storage/expending applications.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

A vehicle that uses one or more battery systems for supporting propulsion, start stop, and/or regenerative braking functions can be referred to as an xEV, where the term "xEV" is defined herein to include all of the below described electrical vehicles, or any variations or combinations thereof.

A "start-stop vehicle" is defined as a vehicle that can disable the combustion engine when the vehicle is stopped and utilize a battery (energy storage) system to continue powering electrical consumers onboard the vehicle, including the entertainment system, navigation, lights, or other electronics, as well as to restart the engine when propulsion is desired. A lack of brake regeneration or electrical propulsion distinguishes a "start-stop vehicle" from other forms of xEVs.

As will be appreciated by those skilled in the art, hybrid electric vehicles (HEVs) combine an internal combustion engine (ICE) propulsion system and a battery-powered electric propulsion system, such as 48 volt, 130 volt, or 300 volt systems. The term HEV may include any variation of a hybrid electric vehicle, in which features such as brake regeneration, electrical propulsion, and stop-start are included.

A specific type of xEV is a micro-hybrid vehicle ("mHEV" or "micro-HEV"). Micro-HEV vehicles typically operate at low voltage, which is defined to be under 60V. Micro-HEV vehicles typically provide start stop, and distinguish themselves from "start-stop vehicles" through their use of brake regeneration. The brake regeneration power can typically range from 2 kW to 12 kW at peak, although other values can occur as well. A Micro-HEV vehicle can also provide some degree of electrical propulsion to the vehicle. If available, the amount of propulsion will not typically be sufficient to provide full motive force to the vehicle.

Full hybrid systems (FHEVs) and Mild hybrid systems (Mild-HEVs) may provide motive and other electrical power to the vehicle using one or more electric motors, using only an ICE, or using both. FHEVs are typically high-voltage (>60V), and are usually between 200V and 400V. Mild-HEVs typically operate between 60V and 200V. Depending on the size of the vehicle, a Mild-HEV can provide between 10-20 kW of brake regeneration or propulsion, while a FHEV provides 15-100 kW. The Mild-HEV system may also apply some level of power assist, during acceleration for example, to supplement the ICE, while the FHEV can often use the electrical motor as the sole source of propulsion for short periods, and in general uses the electrical motor as a more significant source of propulsion than does a Mild-HEV.

In addition, a plug-in electric vehicle (PEV) is any vehicle that can be charged from an external source of electricity, such as wall sockets, and the energy stored in the rechargeable battery packs drives or contributes to drive the wheels. PEVs are a subcategory of xEV that include all-electric or battery electric vehicles (BEVs), plug-in hybrid electric vehicles (PHEVs), and electric vehicle conversions of hybrid electric vehicles and conventional ICE vehicles. BEVs are driven entirely by electric power and lack an internal combustion engine. PHEVs have an internal combustion engine and a source of electric motive power, with the electric motive power capable of providing all or nearly all of the vehicle's propulsion needs. PHEVs can utilize one or more of a pure electric mode ("EV mode"), a pure internal combustion mode, and a hybrid mode.

xEVs as described above may provide a number of advantages as compared to more traditional gas-powered vehicles using only ICEs and traditional electrical systems, which are typically 12 volt systems powered by a lead acid battery. For example, xEVs may produce fewer undesirable emission products and may exhibit greater fuel efficiency as compared to traditional vehicles and, in some cases, such xEVs may eliminate the use of gasoline entirely, as is the case of certain types of BEVs.

As xEV technology continues to evolve, there is a need to provide improved power sources (e.g., battery systems or modules) for such vehicles. For example, it is desirable to increase the distance that such vehicles may travel without the need to recharge the batteries. Additionally, it may also be desirable to improve the performance of such batteries and to reduce the cost associated with the battery systems.

Conventional xEVs have been found to be functionally limited by their electric energy systems that supply power to their electric motor/generator and vehicle accessories. Typically, an electric motor is powered by an energy source that needs to store energy suitable for high-power discharges as well as for electric demands generated by various driving conditions.

Electrical vehicles that can capture energy from braking may produce fewer undesirable emission products and may exhibit greater fuel efficiency as compared to vehicles using ICEs. However, in such vehicles with regenerative power sources the regenerative power is often lost.

Accordingly, it would be desirable for an electrical vehicle to have an energy storage system that can capture all or most of the electrical energy generated by a regenerative power source during a regenerative braking event.

SUMMARY

Disclosed herein are a system and method for optimizing the storing of vehicular energy.

In one aspect, a system for storing electrically a regenerative energy of a vehicle is provided. The system includes a first energy storage device, a second energy storage device, an energy regulating device coupled to the first and second energy storage devices, a source of regenerative power configured to capture a regenerative energy during a regenerative power event of the vehicle, and a control unit coupled to the energy regulating device. The control unit is configured to selectively transfer electrical energy from the first energy storage device to the second energy storage device based on a prediction of the regenerative power event, which is implemented by the energy regulating device. The transfer of the electrical energy serves to reduce the electrical energy stored in the first energy storage device thereby enabling the first energy storage device to receive from the source of regenerative power, when the predicted regenerative power event occurs, an amount of the electrical regenerative energy.

In another aspect, a computer-implemented method of reducing loss of regenerative energy in a vehicle by controlling energy storage devices that power the vehicle includes predicting when a next regenerative power event during a current trip will occur, estimating when a first energy storage device connected for receipt of regenerative energy will be in an optimum condition to receive regenerative energy, and selectively transferring electrical energy from the first energy storage device to a second energy storage device to reduce the loss of regenerative power due to the first energy storage device having an amount of stored electrical energy that is greater than optimal for accepting regenerative energy during the predicted regenerative power event. The method further includes selectively transferring electrical energy from the second energy storage device to the first energy storage device when a state of charge of the first energy storage device is less than a capacity level suitable for performing desired or necessary vehicle functions.

In another aspect, a computing system includes at least one processing unit and at least one memory unit storing instructions that are operable, when executed by the at least one processing unit, to cause the at least one processing unit to perform a method for reducing loss of regenerative energy in a vehicle by controlling energy storage devices that power the vehicle and/or for reducing a loss of opportunity to use stored energy for cranking, propulsion, or high-drain functions.

These as well as other aspects, advantages, and alternatives will become apparent to those of ordinary skill in the art by reading the following detailed description, with reference where appropriate to the accompanying drawings. Further, it should be understood that the disclosure provided in this summary section and elsewhere in this document is intended to discuss the embodiments by way of example only and not by way of limitation.

BRIEF DESCRIPTION OF THE FIGURES

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
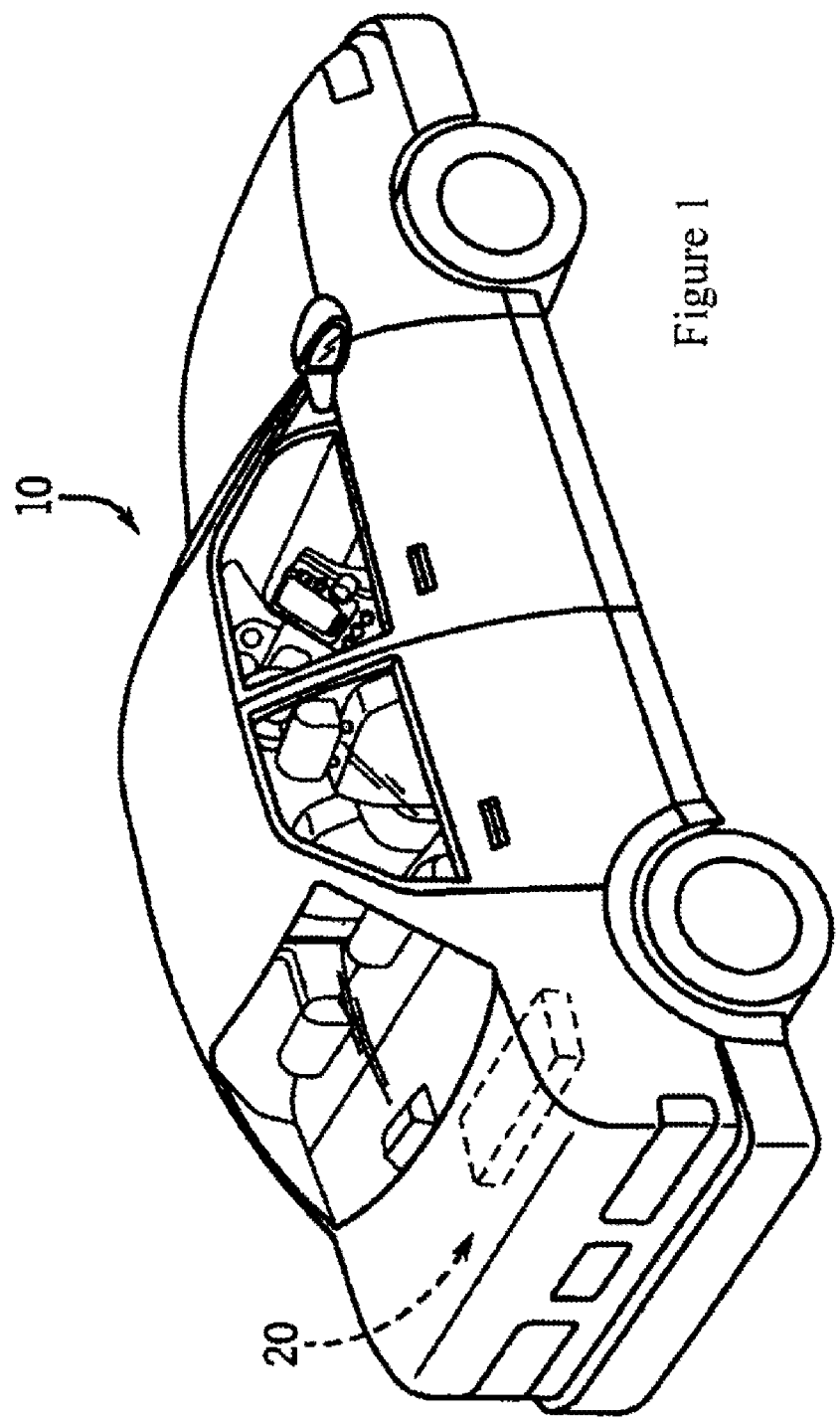
FIG. 1 is a perspective view of a vehicle (an xEV) having a battery system contributing all or a portion of the power for the vehicle, in accordance with an embodiment of the present approach.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

As discussed above, there are several different types of xEVs. Although some vehicle manufacturers, such as Tesla, produce only xEVs and, thus, can design the vehicle from scratch as an xEV, most vehicle manufacturers produce primarily traditional ICEs. Thus, when one of these manufacturers also desires to produce an xEV, it often utilizes one of its traditional vehicle platforms as a starting point. As can be appreciated, when a vehicle has been initially designed to use a traditional electrical system powered by a single lead acid battery and to utilize only an ICE for motive power, converting such a vehicle into its HEV version can pose many packaging problems. For example, a FHEV uses not only these traditional components, but one or more electric motors must be added along with other associated components. As another example, a Micro-HEV also uses not only these traditional components, but a higher voltage battery (e.g., a 48V lithium ion battery module) must be placed in the vehicle to supplement or replace the 12V lead acid battery along with other components such as a belt integrated starter-generator, sometimes referred to as a belt alternator starter (BAS) as described in further detail below. Hence, if a battery system can be designed to reduce such packaging problems, it would make the conversion of a traditional vehicle platform into an xEV less costly and more efficient. As used herein, the BAS is not intended to be limited to a belt-driven alternator starter, as other types of drives could be used.

The battery systems described herein may be used to provide power to a number of different types of xEVs as well as other energy storage applications (e.g., electrical grid power storage systems). Such battery systems may include one or more battery modules, each battery module having a number of battery cells (e.g., lithium ion electrochemical cells) arranged to provide particular voltages and/or currents useful to power, for example, one or more components of an xEV.

Presently disclosed embodiments include lithium ion battery modules that are capable of providing more than one voltage. In particular, certain disclosed battery systems may provide a first voltage (e.g., 12V), for example, to power ignition of a combustion engine using a traditional starter motor and/or support conventional 12V accessory loads, and may provide a second voltage (e.g., 48V), for example, to power a BAS and to power one or more vehicle accessories when the combustion engine is not running, for use in a micro-hybrid system for example. Indeed, in certain embodiments, not only may a single battery system provide two voltages (e.g., 12V and 48V), but it can provide them from a package having a form factor equivalent to a traditional lead acid 12V battery, thus making packaging and conversion of a traditional vehicle to a Micro-HEV simpler, less costly and more efficient.

Present embodiments also include physical battery module features, assembly components, manufacturing and assembling techniques, and so forth, that facilitate providing disclosed battery modules and systems that have a desired form factor (e.g., dimensions corresponding to a traditional lead acid battery). Further, as set forth in detail below, the disclosed battery module embodiments include a number of heat transfer devices (e.g., heat sinks, liquid-cooling blocks, heat transfer foams, phase change materials (PCMs), and so forth) that may be used to passively or actively maintain one or more temperatures of the battery module during operation.

With the foregoing in mind, FIG. 1 is a perspective view of an xEV 10 in the form of an automobile (e.g., a car) having a battery system 20 in accordance with present embodiments for providing all or a portion of the power (e.g., electrical power and/or motive power) for the vehicle 10, as described above. Although the xEV 10 may be any of the types of xEVs described above, by specific example, the xEV 10 may be a Micro-HEV, including an ICE equipped with a micro-hybrid system which includes a start-stop system that may utilize the battery system (energy storage system) 20 to power at least one or more accessories (e.g., AC, lights, consoles, etc.), as well as the ignition of the ICE, during start-stop cycles.

Further, although the xEV 10 is illustrated as a car in FIG. 1, the type of vehicle may differ in other embodiments, all of which are intended to fall within the scope of the present disclosure. For example, the xEV 10 may be representative of a vehicle including a truck, bus, industrial vehicle, motorcycle, recreational vehicle, boat, or any other type of vehicle that may benefit from the use of electric power. Additionally, while the battery system 20 is illustrated in FIG. 1 as being positioned in the trunk or rear of the vehicle, according to other embodiments, the location of the battery system 20 may differ. For example, the position of the battery system 20 may be selected based on the available space within a vehicle, the desired weight balance of the vehicle, the location of other components used with the battery system 20 (e.g., battery management systems, vents or cooling devices, etc.), and a variety of other considerations.

Figure 2:
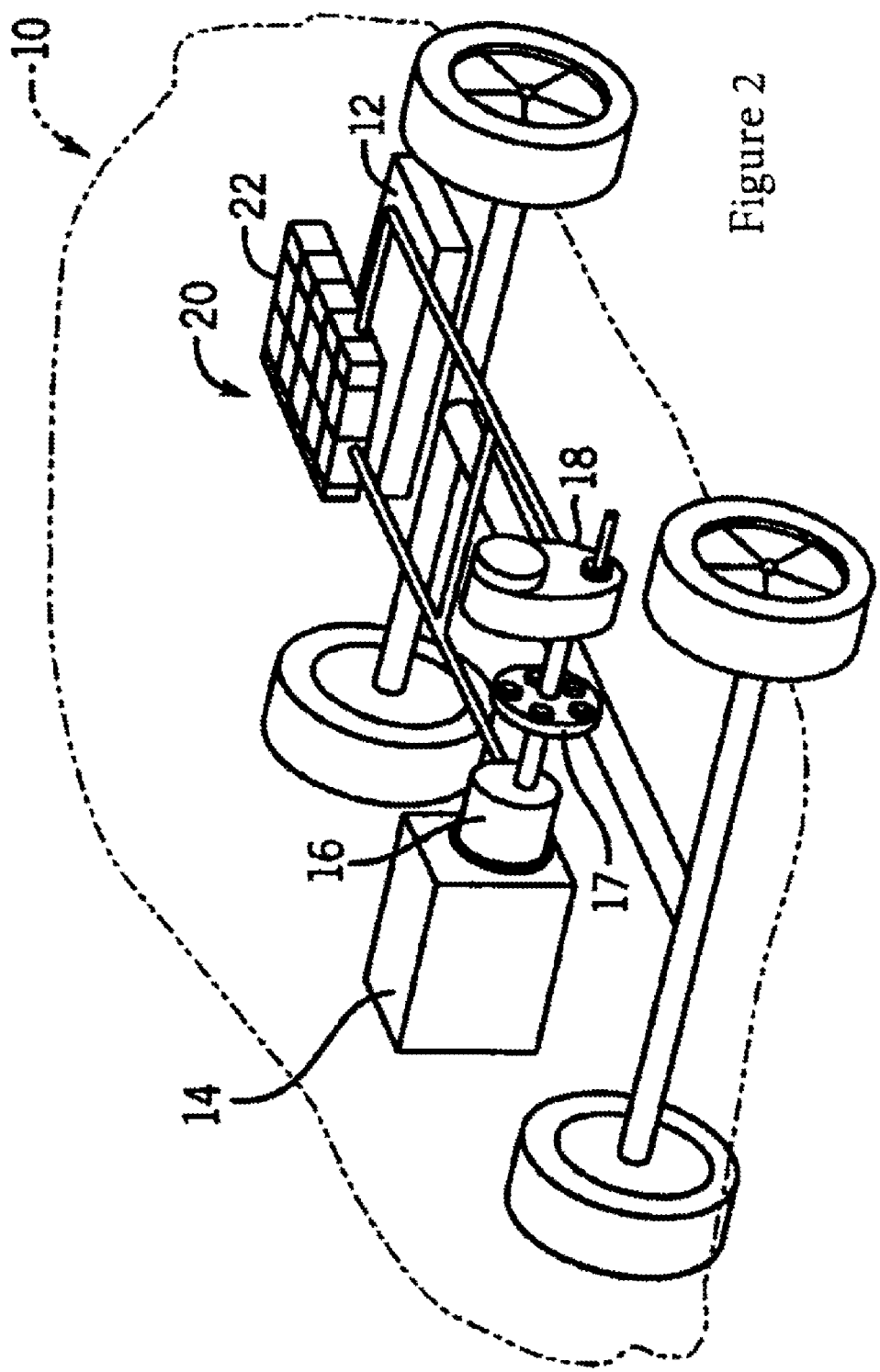
FIG. 2 is a cutaway schematic view of the xEV embodiment of FIG. 1 in the form of a hybrid electric vehicle (HEV), in accordance with an embodiment of the present approach.

FIG. 2 illustrates a cutaway schematic view of an embodiment of the xEV 10 of FIG. 1, provided in the form of an HEV having the battery system 20, which includes one or more battery modules 22. In particular, the battery system 20 illustrated in FIG. 2 is disposed toward the rear of the vehicle 10 proximate a fuel tank 12. In other embodiments, the battery system 20 may be provided immediately adjacent the fuel tank 12, provided in a separate compartment in the rear of the vehicle 10 (e.g., a trunk), or provided in another suitable location in the xEV 10. Further, as illustrated in FIG. 2, an ICE 14 may be provided for times when the xEV 10 utilizes gasoline power to propel the vehicle 10. The vehicle 10 also includes an electric motor 16, a power split device 17, and a generator 18 as part of the drive system.

The xEV vehicle 10 illustrated in FIG. 2 may be powered or driven by the battery system 20 alone, by the combustion engine 14 alone, or by both the battery system 20 and the engine 14. It should be noted that, in other embodiments of the present approach, other types of vehicles and configurations for the vehicle drive system may be utilized, and that the schematic illustration of FIG. 2 should not be considered to limit the scope of the subject matter described in the present application. According to various embodiments, the size, shape, and location of the battery system 20, the type of vehicle, the type of xEV technology, and the battery chemistry, among other features, may differ from those shown or described.

The battery system 20 may generally include one or more battery modules 22, each having a plurality of battery cells (e.g., lithium ion electrochemical cells), which are discussed in greater detail below. The battery system 20 may include features or components for connecting the multiple battery modules 22 to each other and/or to other components of the vehicle electrical system. For example, the battery system 20 may include features that are responsible for monitoring and controlling the electrical and thermal performance of the one or more battery modules 22.

Figure 3:
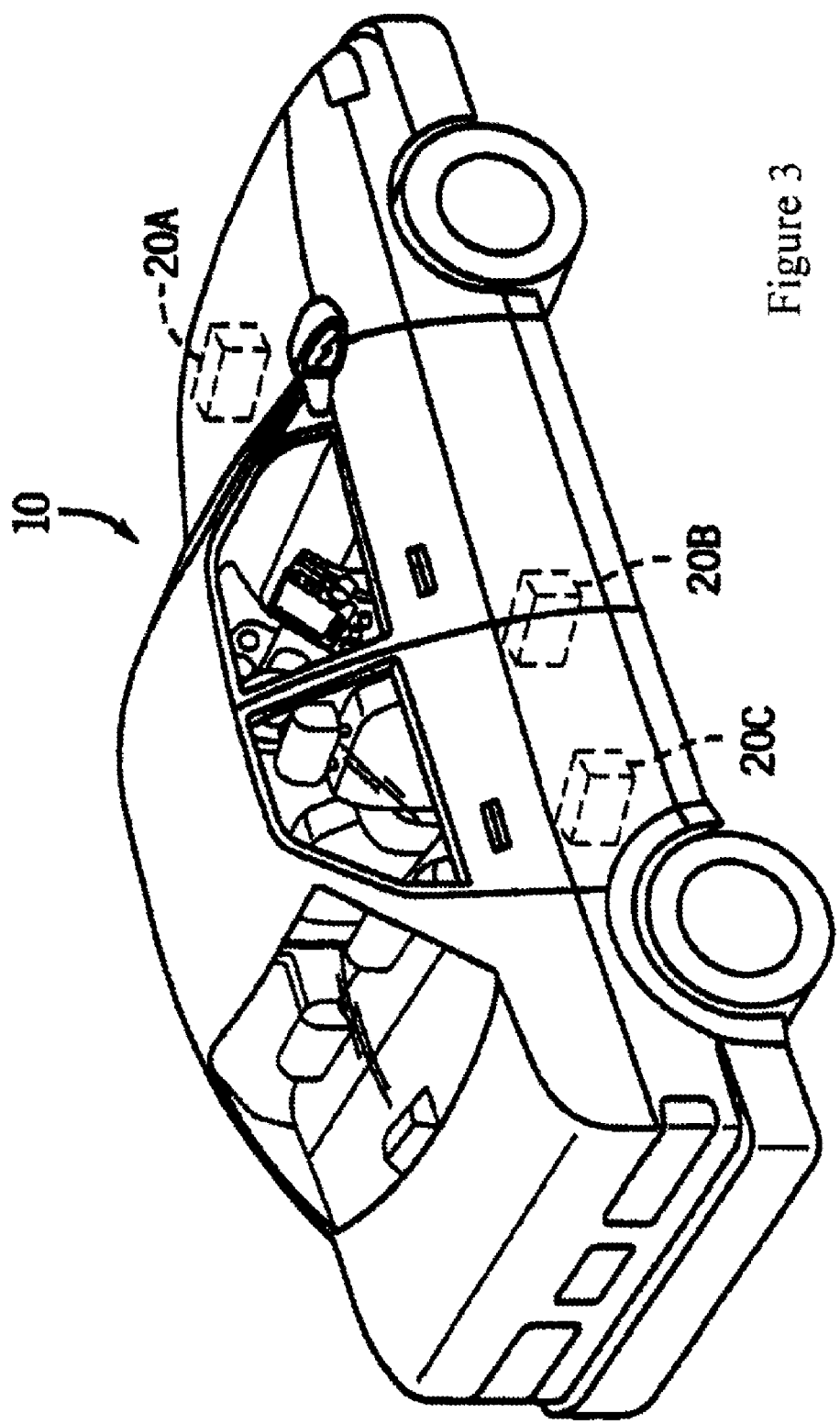
FIG. 3 is a cutaway schematic view of an embodiment of the xEV of FIG. 1 in the form of a micro-hybrid electric vehicle (Micro-HEV), in accordance with an embodiment of the present approach.

FIG. 3 illustrates a cutaway schematic view of another embodiment of the xEV 10 of FIG. 1, provided in the form of a Micro-HEV 10 having the battery system 20. As discussed above, the battery system 20 for use with a micro-hybrid system of an Micro-HEV 10 may include a single battery that provides a first voltage (e.g. 12V) and a second voltage (e.g. 48V) and that is substantially equivalent in size to a traditional 12V lead acid battery used in traditional ICEs. Hence, such a battery system 20 may be placed in a location in the Micro-HEV 10 that would have housed the traditional battery prior to conversion to a Micro-HEV. For example, as illustrated in FIG. 3, the Micro-HEV 10 may include the battery system 20A positioned similarly to a lead-acid battery of a typical combustion-engine vehicle (e.g., under the hood of the vehicle 10). By further example, in certain embodiments, the Micro-HEV 10 may include the battery system 20B positioned near a center of mass of the Micro-HEV 10, such as below the driver or passenger seat. By still further example, in certain embodiments, the Micro-HEV 10 may include the battery system 20C positioned below the rear passenger seat or near the trunk of the vehicle. It should be appreciated that, in certain embodiments, positioning a battery system 20 (e.g., battery system 20B or 20C) in or about the interior of the vehicle may enable the use of air from the interior of the vehicle to cool the battery system 20 (e.g., using a heat sink or a forced-air cooling design, as set forth in detail below).

Figure 4:
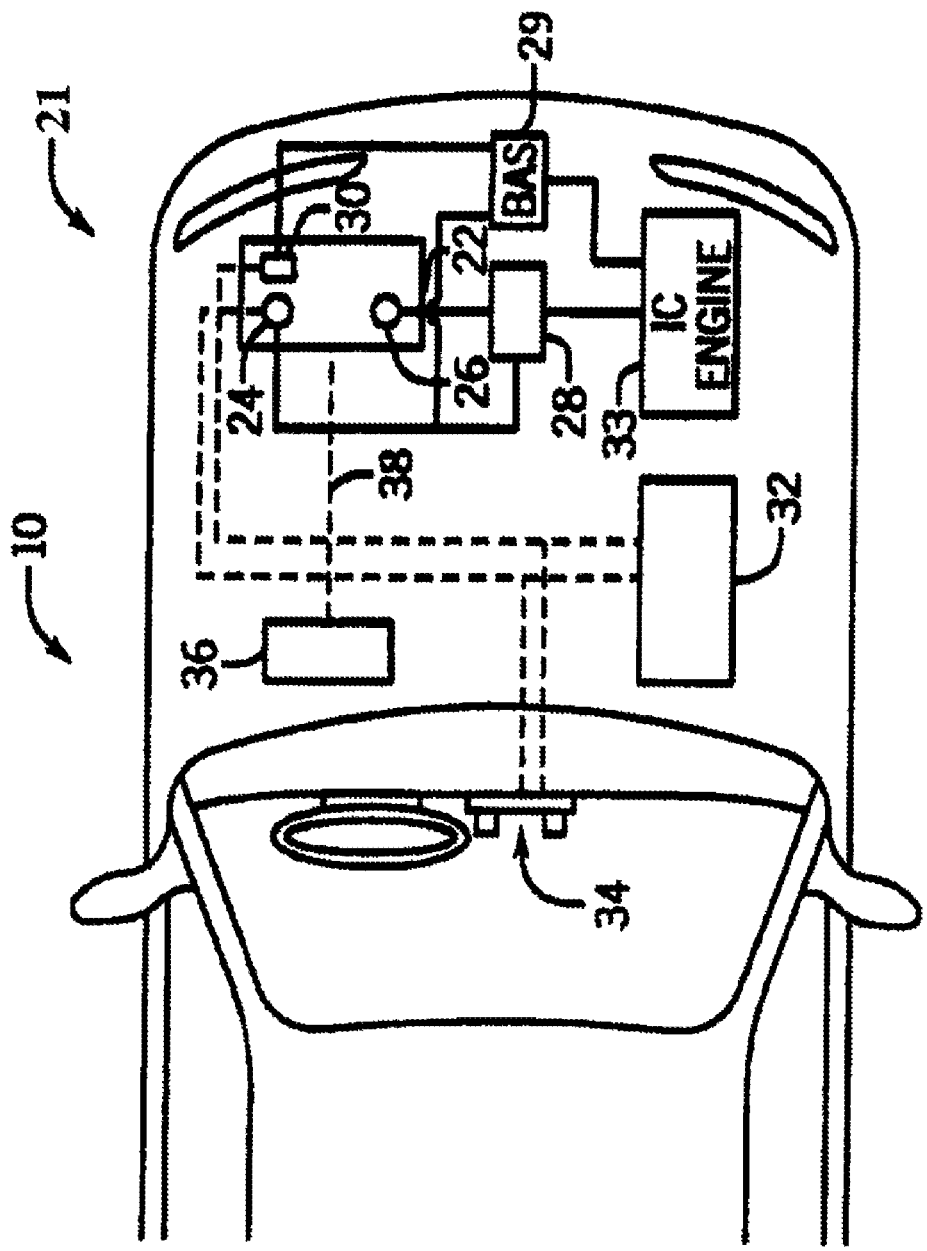
FIG. 4 is a schematic view of the Micro-HEV embodiment of FIG. 3 illustrating power distribution throughout the Micro-HEV, in accordance with an embodiment of the present approach.

FIG. 4 is a schematic view of an embodiment of the Micro-HEV 10 of FIG. 3 having an embodiment of an energy system 21 disposed under the hood of the vehicle 10 and includes battery system 20. As previously noted and as discussed in detail below, the battery system 20 may further have dimensions comparable to those of a typical lead-acid battery to limit or eliminate modifications to the Micro-HEV 10 design to accommodate the battery system 20. Further, the battery system 20 illustrated in FIG. 4 is a three-terminal battery that is capable of providing two different output voltages. For example, a first terminal 24 may provide a ground connection, a second terminal 26 may provide a 12V output, and a third terminal 30 may provide a 48V output. As illustrated, the 48V output of the battery module 22 may be coupled to a BAS 29, which may be used to start the ICE 33 during start-stop cycle, and the 12V output of the battery module 22 may be coupled to a traditional ignition system (e.g., starter motor 28) to start the ICE 33 during instances when the BAS 29 is not used to do so. It should also be understood that the BAS 29 may also capture energy from a regenerative braking system or the like (not shown) to recharge the battery module 22.

It should be appreciated that the 48 V and 12 V outputs of the battery module 22 may also be provided to other components of the Micro-HEV 10. Examples of components that may utilize the 48 V output in accordance with present embodiments include radiator cooling fans, climate control fans, electric power steering systems, active suspension systems, electric air-conditioning systems, auto park systems, cooled seats, electric oil pumps, electric super/turbochargers, electric water pumps, heated seats, heated windscreen/defrosters, and engine ignitions. Examples of components that may utilize the 12 V output in accordance with present embodiments include window lift motors, vanity lights, tire pressure monitoring systems, sunroof motor controls, power seats, alarm systems, infotainment online features, navigation features, lane departure warning systems, electric parking brakes, and external lights. The examples set forth above are not exhaustive and there may be overlap between the listed examples. Indeed, for example, in some embodiments, features listed above as being associated with a 48 V load may utilize the 12 V output instead and vice versa.

In the illustrated embodiment, the 48 V output of the battery module 22 may be used to power one or more accessories of the Micro-HEV 10. For example, as illustrated in FIG. 4, the 48 V output of the battery module 22 may be coupled to the heating, ventilation, and air conditioning (HVAC) system 32 (e.g., including compressors, heating coils, fans, pumps, and so forth) of the Micro-HEV 10 to enable the driver to control the temperature of the interior of the Micro-HEV 10 during operation of the vehicle. This is particularly important in a Micro-HEV 10 during idle periods when the ICE 33 is stopped and, thus, not providing any electrical power via engine charging. As also illustrated in FIG. 4, the 48 V output of the battery module 22 may be coupled to the vehicle console 34, which may include entertainment systems (e.g., radio, CD/DVD players, viewing screens, etc.), warning lights and indicators, controls for operating the Micro-HEV 10, and so forth. Hence, it should be appreciated that the 48 V output may, in certain situations, provide a more efficient voltage at which to operate the accessories of the Micro-HEV 10 (e.g., compared to 12 V), especially when the ICE 33 is stopped (e.g., during start-stop cycles). It should also be appreciated that, in certain embodiments, the 48 V output of the battery module 22 may also be provided to any other suitable components and/or accessories (e.g., lights, switches, door locks, window motors, windshield wipers, and so forth) of the Micro-HEV 10.

Also, the Micro-HEV 10 illustrated in FIG. 4 includes a vehicle control unit/module (VCM) 36 that may control one or more operational parameters of the various components of the vehicle 10, and the VCM 36 may include at least one memory and at least one processor programmed to perform such tasks. Like other components of the Micro-HEV 10, the battery module 22 may be coupled to the VCM 36 via one or more communication lines 38, such that the VCM 36 may receive input from the battery module 22, and more specifically, the battery control module (BCM) of the battery module 22 (discussed in detail below). For example, the VCM 36 may receive input from the battery module 22 regarding various parameters, such as state of charge and temperature, and the VCM 36 may use these inputs to determine when to charge and/or discharge the battery module 22, when to discontinue charging the battery module 22, when to start and stop the ICE 33 of the Micro-HEV 10, whether to use the BAS 29 or the starter 28, and so forth.

In order to maximize energy utilization and fuel economy for a micro-hybrid, mild-hybrid, or hybrid electric vehicle, it is known to utilize a regenerative power source, such as kinetic energy recovered during braking ("regenerative braking"), as well as wind, solar, and/or any non-fossil fuel generating device, in order to provide electrical energy to batteries or other energy storage device. Some of these vehicles may be equipped with the means to transfer energy from the energy storage device(s) back to the wheels to provide propulsion power to the vehicle.

However, the regenerative power is typically only available during certain periods of vehicle operation, with highly variable duration and period of recurrence. As such, if the energy storage device that is to accept electrical energy from the regenerative power source is at its maximum state of charge (SOC) at the time of the regenerative power event, then it cannot accept any more electrical energy from the regenerative power source and all of the regenerative power is lost. If the SOC of the energy storage device is not at its maximum SOC level but still charged with electrical energy above a particular level, then a portion of the regenerative power will be lost.

Similarly, the vehicle must be capable of re-starting the engine when stopped, and as a result the ESS must maintain enough power to perform engine cranking. In some ESS configurations, two or more energy storage devices may be required to provide power to crank the vehicle, requiring both devices to be at SOC levels that are high enough to do so. Further, some vehicles may have the ability to provide vehicle propulsion. While energy from the ESS may in principle be used to propel the vehicle anytime it is moving, efficient operation will realized by utilizing electrical propulsion (in which all or part of the vehicle's propulsion arises from electricity) during selected time periods. If the SOC of the high-power device is too low, this opportunity will be lost, in part or in whole.

In accordance with the present disclosure, to improve system efficiency of a Micro-HEV, Mild-HEV, HEV, or other vehicle capable of recovering regenerated energy, an ESS that is configured to optimally receive and supply electrical energy is provided. The ESS is configured to handle high power discharging and charging functions triggered by various driving conditions/modes, such as starting, cruising, accelerating, and regenerative braking, and/or partial/full electrical propulsion. One way to improve the performance, cycle life, and power characteristics of an ESS is to combine different types of energy storage devices that include a high power storage device, such as a high-power lithium-ion battery or an ultra-capacitor, and a high energy device such as a lead-acid battery. One such ESS can be referred to as a hybrid energy storage system (HESS).

Typically, for a Micro-HEV or Mild-HEV, idle stopping and starting events increase the number of times the ICE is started, thereby triggering frequent high current discharges from the ESS. The regenerative braking events trigger high charging currents for storage by the ESS in a short time span when kinetic energy of the micro or mild HEV is transformed into electrical energy while braking. Similarly, partial/full electrical propulsion occurs in high-power discharge bursts. Accordingly, a control unit of the HEV is configured to selectively connect an appropriate energy storage device to a power network of the ESS based on SOC information.

In one embodiment, the SOC of each energy storage device can be manipulated based on the vehicle driving conditions, such as vehicle speed. Once such manipulation involves lowering the SOC of an energy storage device, such as a high power device, by transferring part of the stored energy to another energy storage device, such as a high energy device, in advance so as to receive more recuperative energy when regenerative braking is expected or predicted. Another such manipulation involves raising the SOC of the high power energy storage device by transferring required electrical energy from the high energy storage device when engine restarting or power boosting is predicted. In order to achieve these transfers of electrical energy between these two energy storage devices, a means of selective energy transfer and/or conversion, such as a switch or direct current/direct current (DC/DC) converter, can be used to couple them.

Figure 5:
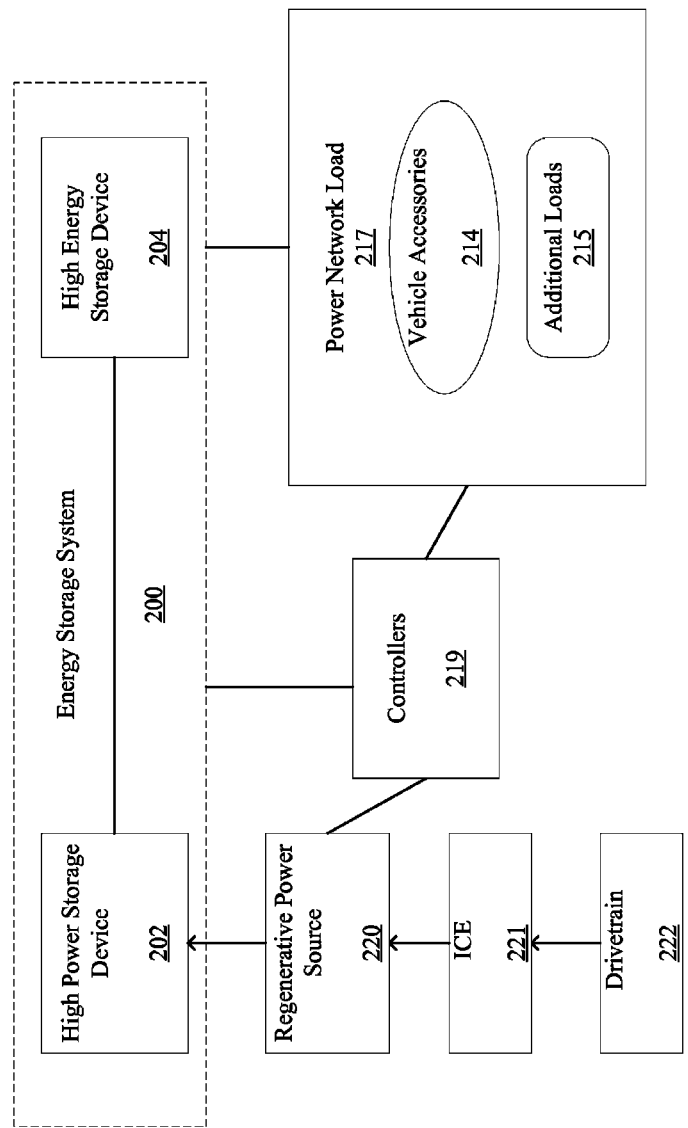
FIG. 5 is a block diagram illustrating an exemplary embodiment of an energy storage system.

Referring to FIG. 5, an exemplary embodiment of basic elements of ESS 200 of the present disclosure that may be used with the vehicle 10 is shown. ESS 200 may include two or more energy storage devices such as batteries, capacitors, ultra capacitors, or any other type of energy storage device capable of providing stored power to a vehicle accessory load and to an engine starting unit.

In one embodiment, ESS 200 includes at least two energy storage devices 202 and 204. Energy storage device 202 is structured as a high power device capable to accept/capture a relatively large amount of power in a short amount of time, such as a lithium-ion battery, capacitor or ultra-capacitor. For example, energy storage device 202 is sized to enable the capture of most or all available regenerative energy available during a regenerative braking event. The exact energy and power required will depend on many factors, such as vehicle type (HEV, Micro-HEV, Mild-HEV, etc.), vehicle weight, generator size and other like factors. For example, for a 48-volt micro-hybrid system with a generator of approximately 8-12 kW, the system should be capable of accepting around 8-12 kW for a representative braking duration, but the usable energy need for brake regeneration is only about 100-Wh. The actual energy capacity may be higher to account for other functional requirements as well as the need to size the high-power device based on power limits in addition to energy content. Capable devices include all types of batteries (including lithium-ion, lithium polymer, and nickel-metal-hydride) and capacitors (including electrolytic, electric double layer, lithium, asymmetric and pseudo-capacitors) as well as other devices capable of accepting and/or delivering high levels of electrical power.

In this embodiment, energy storage device 204 is structured as a high energy device that is capable of storing large amounts of energy. The amount of energy required by high energy storage device 204 is determined largely by tasks such as maintaining low currents while the vehicle engine is turned off. For instance, key-off loads, such as an intrusion alarm may have to be maintained for up to thirty days or more. Given an assumed load of 25-mA @12-volts while vehicle 10 is stopped, a usable energy requirement of around 250-Wh may be required. Device 204 may also sustain part or all of the electrical loads when the vehicle is running, which may add additional size requirements. Other requirements may further change the need for energy content in device 204.

High power storage device 202 is connected to receive electrical energy from a regenerative power source 220 coupled to an ICE 221 that is in-turn coupled with a drive train 222 during regenerative power events, such as when vehicle 10 is decelerating. In addition, device 202 may also be used to provide propulsion energy back to the vehicle as well, such as during acceleration. In turn, high energy storage device 204 is connected to receive energy from high power energy storage device 202. Alternatively, both energy storage devices 202 and 204 may be connected to regenerative power source 220 to receive regenerative energy when both of their respective SOCs need to be increased, or when both devices must be used to accept all of the regenerative braking power. In this alternate scenario, high energy storage device 204 may receive regenerative power but at a lower level than high power storage device 202, or when device 202 is less capable for any reason. In one embodiment, regenerative power source 220 may be any device capable of converting mechanical energy into electrical power or which converts fuel into electricity via an internal combustion engine, or both.

In accordance with the disclosure, one or more controllers 219 are programmed to cause electrical energy to move from high power storage device 202 to high energy storage device 204 based on a prediction of a regenerative power event to enable and facilitate maximum receipt and storage of the regenerative energy when the predicted regenerative power event occurs, as well as to provide propulsion and/or cranking capability when the need arises, in the case that the vehicle is so configured.

Vehicle 10 has a number of electrical accessories that require accessory power to be supplied to a respective accessory load 214. Electrical accessories can be any devices that rely on electric power for operation, and can now or may in the future include things such as an air conditioning system, a GPS unit, display units such as liquid crystal displays (LCDs), heating units such as heaters and defrosters, condenser motors, any heating ventilation and air conditioning (HVAC) components and/or controls, any hydraulic device such as power brakes or power steering, entertainment units including a stereo system and speakers, power door locks and power windows, computers, processors, storage devices, sensors, and any other such devices.

The operating power of accessory load 214 and additional loads 215, which together define a power network load 217, is obtained from both energy storage devices 202 and 204 of ESS 200 under normal operating conditions. Accessory load 214 may include load from any of the accessories defined above, such as air conditioning, heaters and defrosters. Additional load 215 may include such items as braking assist, acceleration assist and motive power.

Figure 6:
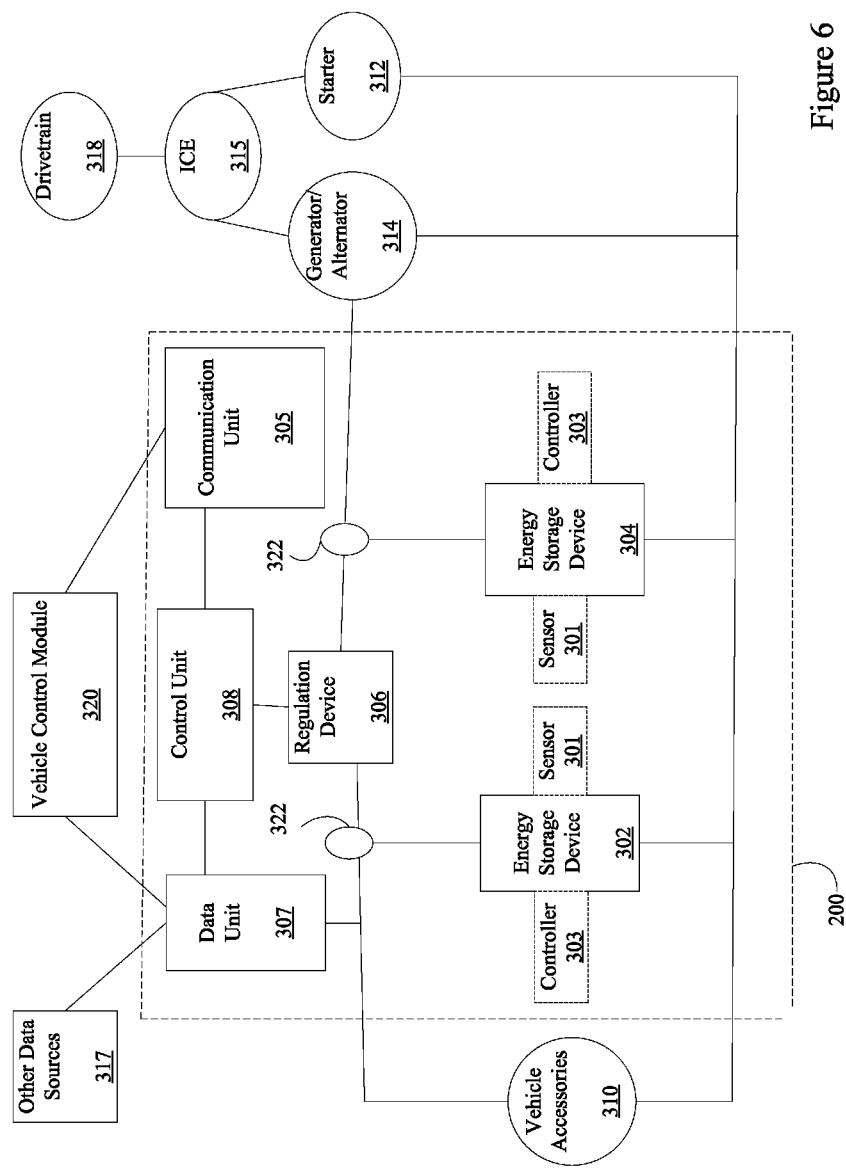
FIG. 6 is a block diagram illustrating the energy storage system and components of the vehicle that are coupled to the energy storage system.

Now referring to FIG. 6, an exemplary embodiment of an energy storage system (ESS) includes dual energy storage devices and is configured for the application in an electric vehicle, which has functions such as start stop, regeneration braking, and passive boost. As shown in FIG. 6, an ESS 300 includes two energy storage devices 302 and 304, a communication unit 305, a voltage/current/power regulating (regulation) device 306, a data unit 307, and a control unit 308. Moreover, each of energy storage devices 302 and 304 may be coupled to a state (electrical or thermal) sensing unit 301 and to an operation controller 303. In one embodiment, regulation device 306 is configure to regulate the flow of electricity between at least two or more devices of ESS 300. With this arrangement, regulation device 306 can control the voltage (allowing current to match power demand), and can control the current (allowing voltage to match power demand), and can control a combination of the voltage and the current (e.g., mixing the two controls). In one embodiment, regulation device 306 can be a switch, a DC/DC converter unit, or another device that can regulate the flow of electricity between devices 302 and 304.

As shown, energy storage device 302 is connected to electrical accessories 310, and energy storage device 304 is connected to a starter unit 312 and an alternator or generator unit 314. Alternatively, starter unit 312 and alternator/generator unit 314 can be combined into an integrated starter-generator that provides both starter and generator functions. Alternator/ generator unit 314 can also be designed to provide bi-directional capability, allowing it act as a motor as well. Moreover, starter unit 312 and alternator/generator 314 are coupled to ICE 315, which is in turn coupled to a vehicle drive train 318.

As shown, ESS 300 includes a vehicle control module or monitoring unit 320 that is coupled to a control unit 308. Monitoring unit 320 may be integrated with the ESS, it may be integrated with control unit 308, it may be a standalone component, or it may be integrated with some other unit. Additionally, ESS 300 includes sensing devices 322 configured for sensing signals of currents, voltages, temperatures, and/or other data arising from monitoring energy storage devices 302 and 304, and any other suitable sensing devices. Further, ESS 300 can include switching units (not shown) that can serve to disconnect/decouple or connect/couple the above cited elements from one another.

In one embodiment, energy storage device 302 is configured as a high energy storage device, and energy storage device 304 is configured as a high power storage device. As introduced above, regulation device 306 can directly control the passing of electrical energy from high power energy device 304 to the high energy storage device 302 under control of control unit 308. Sensing and/or other data may be collected by a data unit 307 from the vehicle, from vehicle accessories 310, from energy storage devices 302 and 304, from drivetrain components 312, 314, 315, and/or 318, and/or from other data sources 317, such as environmental data sources. This data can be communicated to one or more of regulation unit 306, control unit 308, and/or vehicle control module 320, and/or with the vehicle itself. This transfer can be performed by communication unit 305, which can be either a wired or wireless unit, and use any communication protocol. One or more of energy storage devices 302 and 304 provide power to vehicle accessories 310. One or more of vehicle control module 320, control unit 308, and/or regulation device 306 can be configured to communicate with one or more of units 314, 315, 312, and/or 318 to establish a level of mechanical energy associated with historical, current and/or predicted vehicle and/or drivetrain function, such as regenerative energy events. The data, from one or more of units 312, 314, 315, and 318, other sources of data 317, obtained by vehicle control module 320 and/or data unit 307, may be needed by control unit 308 and/or regulation device 306 to perform their control and/or regulation functions, as described hereafter.

Control unit 308 is configured to perform control functions based on the data received from the various sources noted above. In one embodiment, based on the received data control unit 308 determines a relative likelihood of reaching an opportunity for brake regeneration while there is a greater than optimal amount of energy in the storage device selected for accepting regeneration power, that is, high power storage device 304. Control unit 308 further evaluates a risk of losing regenerative power during a next predicted regenerative power event due the high power storage device 304 having too much electrical energy (i.e., a high SOC) to accept a full amount of electrical energy generated by ICE 315 during a window of time during which the next regenerative event will likely occur. If there is a risk of losing regenerative power, then control unit 308 may cause energy regulating device 306 to pass electrical energy from high power storage device 304 to the high energy storage device 302. Whether control unit 308 in fact selectively causes electrical energy to be passed from energy storage device 304 to energy storage device 302 can depend upon whether doing so will result in a net gain of energy for ESS 300, with due consideration of any energy losses inherently incidental to the passing of current from storage device 304 to energy storage device 302.

In another embodiment, in which unit 314 functions as a motor/generator, control unit 308 will ensure that sufficient charge exists in energy storage device 304 to ensure that partial or full electrical propulsion ("boost") is possible. In doing so, energy may be transferred from energy storage device 302 to energy storage device 304 using regulation device 306.

In another embodiment, in which energy storage device 304 is coupled to starter 312 and in which energy storage device 304 is needed in full or in part for engine cranking, control unit 308 will ensure that sufficient charge exists in energy storage device 304 to ensure cranking. In doing so, energy may be transferred from energy storage device 302 to energy storage device 304 using regulation device 306.

In accordance with the present disclosure, a power demand from vehicle accessories 310 can be predicted into the future by control unit 308 based upon any one of a variety of factors, such as the recent trailing history of a vehicle power network (powernet) usage over multiple time scales. The recent trailing history over a time period from less than a second to an hour or so during a current driving trip is utilized. Prior history of accessory usage during prior driving trips may also be used. Control unit 308 may also receive input information concerning the route that vehicle 10 is taking from a navigation system (not shown), from a prior history during previous trips, from environmental data, from vehicle accessories, from consumer accessories, and from route information from vehicle control module 320. Data concerning the current vehicle state, including current speed and acceleration, may also be also obtained by the control unit 308 from vehicle control module 320. All this data may be used to estimate and amount of energy usage and resultant discharging of the energy storage device 304 that will occur before a time frame during which a next predicted regenerative power event will likely occur.

Control unit 308 is configured to receive current, voltage, temperature, capacity, SOCs, and/or other sensor data from energy storage devices 302 and 304, and receives sensor and vehicle data and other data, such as route information, from vehicle control module 320. Control unit 308 then determines the relative likelihood of reaching an opportunity for brake regeneration (i.e. a regenerative power event) while there is a "greater than optimal" amount of energy in energy storage device 304 that will limit the amount of electrical energy that can be accepted and stored in energy storage device 304. If the opportunity risk for a loss of electrical energy from brake regeneration is greater than the inherent energy loss associated with passing electrical energy from energy storage device 304 to energy storage device 302, then at least some electrical energy is moved from energy storage device 304 to energy storage device 302. Evaluation of the inherent loss associated with passing electrical energy from energy storage device 304 to energy storage device 302 may also include energy storage device component efficiency information from an available source including pre-stored defined constants from a component manufacturer, collected data from the ESS, or other sources. In one embodiment, the opportunity risk will be determined by combining SOCs of energy storage device 304 and energy storage device 302 along with an estimation of the time to the next regenerative power event. In another embodiment, this method may be used to determine the risk to electrical "boost" (if so configured), or vehicle cranking, in which case the SOC may be raised accordingly. These needs may also be weighed by control unit 308 to determine the appropriate action by regulation unit 306.

Being equipped with the at least two energy storage devices 302 and 304, ESS 300 is configured to ensure by using the above discussed energy transfer processes that high power energy storage device 304 is as empty as practicable, i.e. having an acceptable low SOC, when a regenerative power event occurs. The definition of "practicable" may vary, depending on whether the vehicle is required to perform boosting or cranking functions. The utilization of energy in ESS 300 is optimized such that any energy lost due to inefficiency of conversion or transfer is equal to or less than the benefits accrued from moving the energy. One measure of accrued benefit is the amount of regenerative braking power from generator/alternator 29 that may be lost due to energy storage device 304 not having its stored electrical energy reduced enough at a start of a regenerative power event. Another measure is the excess fuel required for propulsion due to the lack of boost opportunity. This cost benefit analysis is considered after ensuring that energy storage device 304 is capable of supporting engine cranking, if it is required to do so. Additionally, if a power demand of vehicle accessories 310 is so high that passing energy will be disruptive to ESS 300, vehicle 10, or any other accessory in vehicle 10 that uses energy in vehicle 10, then control unit 308 will refrain energy regulating device 306 from passing electrical energy from high power storage device 304 to high energy storage device 302.

On the other hand, if the power demand of vehicle accessories 310 is sufficiently low compared to the SOC that it is likely that regenerative braking opportunity will be lost, control unit 308 triggers energy regulating device 306 to transfer enough electrical energy from high power storage device 304 to the high energy device 302 to ensure that high power storage device 304 is discharged as much as practicable prior to the next regenerative power event. In one embodiment, energy regulating device 306 can determine an optimal rate of electrical energy transfer, or an optimal time profile of electrical energy transfer, between energy storage device 304 and energy storage device 302 to reduce power transfer loss and maximize a chosen criterion, such as energy efficiency or overall fuel economy of the vehicle.

In order to optimize cost versus benefit of vehicle design, high power storage device 304 may be minimized in terms of size and capability and thus may have limited capacity. Further, the design of such a device may optimize power capability at the expense of energy capacity. In such case of limited capacity, it may be necessary to offload captured regeneration energy before the next regenerative power event in order to avoid losing the opportunity to capture more regeneration energy. The need to offload and move captured regeneration energy also depends on how quickly electrical energy can be used by vehicle accessories 310. If the expected load current of vehicle accessories 310 is too low, electrical energy should be moved if indicated by other factors. In accordance with the present disclosure, whatever information is available it can be used to predictively determine when the next regenerative power event will likely occur, how quickly the expected load current will drain high power storage device 304 receiving regeneration power and the likelihood that the regeneration capability will be impacted negatively through excess remaining energy in high energy storage device 302. If this consideration outweighs the inefficiency of moving energy between the between the two energy storage devices 304 and 302, then the electrical energy is moved from energy storage device 304 to energy storage device 302.

Figure 7:
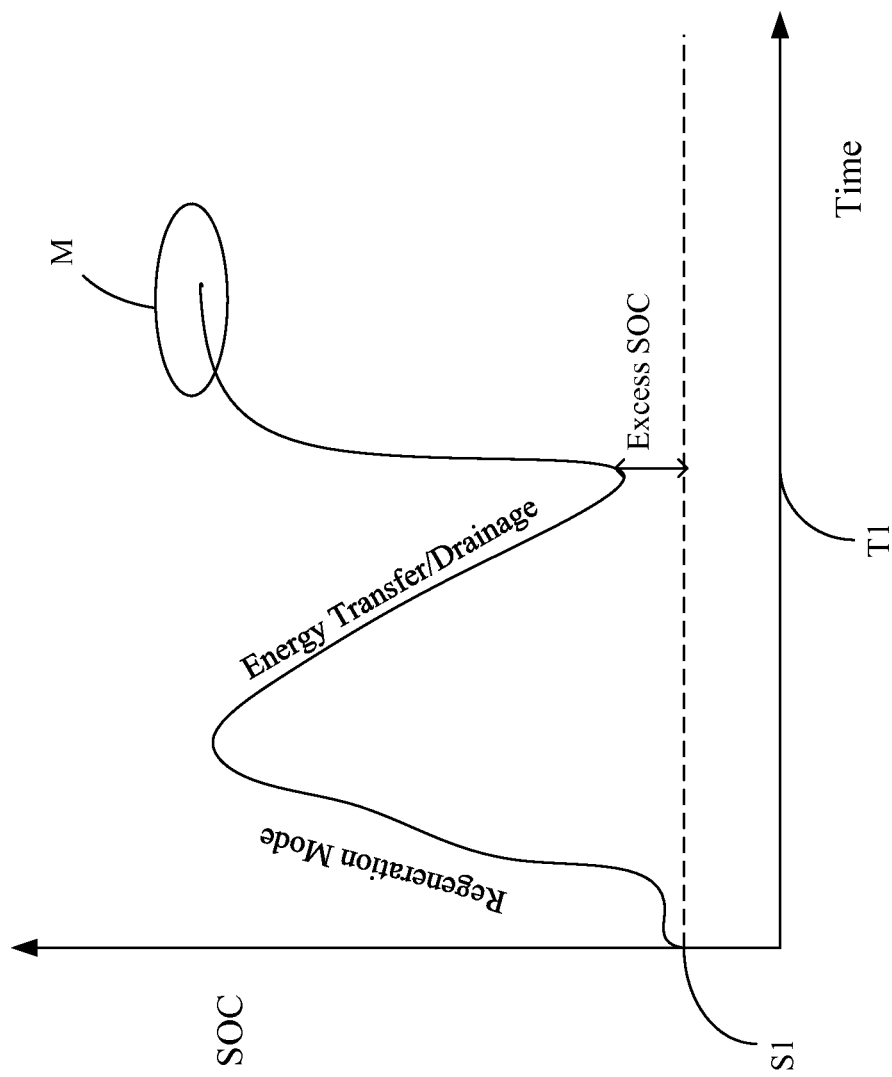
FIG. 7 is a graph illustrating the state of charge of an energy storage device during an energy draining mode and a regeneration mode triggered by an energy regenerating event.

Now referring to FIG. 7, an exemplary embodiment of a graph illustrating of the loss of regeneration power in conventional energy storage systems shows that this occurs at section M when energy storage device 304 reaches a maximum SOC and cannot accept any more power from a regenerative power event. This scenario may occur because at the beginning of the regenerative power event, the current SOC is above a desirable and appropriate low SOC target S1. A difference between the electrical energy at time T1 when the regenerative power event occurs and low SOC target will be related to the amount of regenerative power that is lost. If the SOC at the beginning of a regenerative power event is at maximum, then, for example, all of the power from the regenerative power event can be lost.

In the case of vehicle 10, the above-discussed regenerative events occur when operation of the vehicle requires removal of kinetic energy from the vehicle. Regeneration can occur when the brakes are applied, whether the vehicle decelerates or whether braking is necessary to maintain desired speed (such as on a downhill). Additionally, regeneration can also occur upon other signals, such as cessation of acceleration (foot off accelerator or similar), as part of cruise control operation, or in any other situation in which kinetic energy should be removed from the vehicle. In other embodiments, vehicle 10 may include other regenerative power sources (not shown) associated with solar power and wind power, for example. The solar power regenerative events may occur when the sun shines with at least a particular intensity. The wind power regenerative event may occur when the wind blows above a certain speed. Accordingly, regenerative power transfer source 16 may be any source of generating electrical power to electrical energy storage devices 302 and 304.

Figure 8:
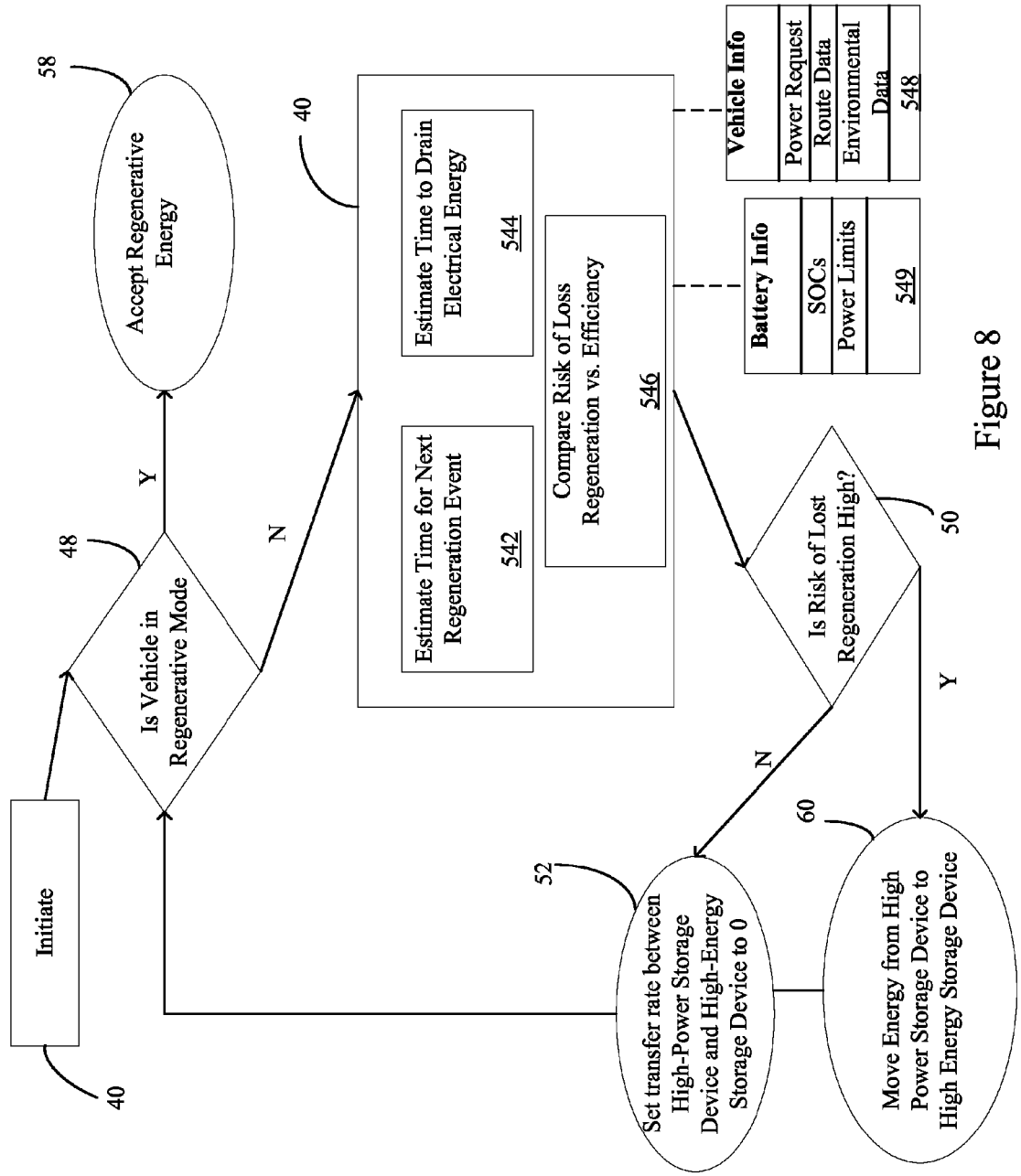
FIG. 8 is a flow chart of an operational process/method that illustrates both the elements of the energy storage system and their operation to achieve capture and storage of energy during an energy regenerating event.

Now referring to FIG. 8, a flow chart of an exemplary embodiment of a process (method) for controlling ESS 300 and particularly energy storage devices 302 and 304 to accommodate a capture of regenerative braking energy is initiated at Step 40. In FIG. 8, dotted lines represent data flow, solid lines indicate operation flow, rectangles represent algorithmic operations, ovals represent vehicle functions, and diamonds represent algorithmic decisions. At Step 48, control unit 308 is configured to determine whether vehicle 10 is in a regenerative mode (i.e., experiencing a regenerative power event). In the affirmative, high power storage device 304 accepts regeneration power, at Step 58. Once the regenerative power event is completed, control unit 308 is configured to implement sub-processes 542, 544, and 546.

Part of the operational process includes three sub-processes 542, 544, and 546. Sub-process 542 is configured to estimate the time to the next regenerative power event. Sub-process 544 is configured to estimate the time to drain high power storage device 304 connected to receive the regenerative power from alternator/generator 314. Sub-process 546 is configured to compare a risk of lost regeneration because of excess stored electrical energy versus the negative impact that disruption of normal operation of vehicle accessories 310 may cause. These determinations may be based on power request data, route data, and other data obtained from the sources of information discussed above, including state of electrical energy data, power limits data, and other data relating to energy storage information.

The estimated time to the next regenerative power event can use any information available to ESS 300. The time to the next regenerative power event may be calculated from a given stop frequency using a statistical model. The time to the regenerative power event may also be estimated in part from the type of driving that is being experienced which, in turn, may be determined from speed and acceleration trend information including minimum/average/maximum speed and acceleration as well as from heading and turn information. As an alternative to minimum/average/maximum data, a histogram or full data series may be used. The estimated time may also be determined, at least in part, from stored driving data that may be used to infer the route and thus the time of the next stop.

Further, stored battery data may be used to infer when brake regenerative power events have occurred based on one or more of charging power, charging voltage, duration of a charging event, voltage-current-power signal characteristics, and other battery characteristics. Also, the prediction of when a next regenerative event will likely occur may be based in part on explicit route information that may be received from a vehicle navigation system, user devices or other environmental data sources. Alternatively, the route or route type (such as city, suburban, or rural driving pattern) may be detected by the vehicle or energy storage system by an internal or external GPS receiver and the like.

As shown in FIG. 8, vehicle data 548 including power request, route data, and climate control data, and other data noted above from vehicle monitoring unit 320 or elsewhere is provided. In addition, battery information 549 including SOCs, power limits, and other battery data noted above, is also provided to achieve the estimation.

Sub-process 544 that estimates the time required to drain energy storage devices receiving regenerative power is configured to use present and expected information concerning vehicle accessories 310, the capacity of high power storage device 304, the desired low SOC set point S1 and other information to make the estimate. The power demand of vehicle accessories 310 can represents the total of all the electrical power consuming units that depend on ESS 300 for power including. The demand of vehicle accessories 310 can be calculated at any given time based on the present demand. Alternatively, or additionally, the demand of vehicle accessories 310 can be calculated based on a prediction of future demand. The prediction of future demand may be based on past demand and external information from the vehicle monitoring unit 320 and elsewhere. The usable energy capacity of an energy storage device, such as energy storage device 302 or 304, is defined as the total energy content that can be stored in the energy storage device given all relevant restrictions and requirements on the use of the components of the energy storage device. This capacity is different than the total energy capacity of the device, and depends on the state of SOC, the minimum state of electrical energy, the capacity measured in ampere-hours, operational voltage, and other considerations. The usable energy capacity of an energy storage device is approximately equal to the difference between the maximum and minimum state of electrical energy times the capacity in ampere-hours times the operational voltage, with the operational voltage being highly dependent on the charge or discharge rate. The estimated state of charge of the electrical energy of an energy storage device can be defined as the amount of electrical energy stored in the energy storage device divided by the total capacity of the energy storage device. The minimum state of electrical energy of an energy storage device may be determined based on many factors including the need to prevent damage to the energy storage device in question and the need to maintain a reserve of energy and the need to keep the resistance below a certain threshold. The operational voltage of an energy storage device may vary depending on factors including the utilization of the energy storage device due to the IR voltage drop on electrical energy, which reduces the operational voltage of the energy storage device.

With this information, sub-process 544 can determine an estimated time to drain energy storage device 304. This can be accomplished by calculating the capacity of energy storage device 304 in joules divided by the expected load of vehicle accessories 310 in watts to yield a time in seconds until energy storage device 304 has been emptied to the optimum SOC target level S1. The expected load of vehicle accessories can be determined using any data sources available to sub-process 544, including recent trailing history of accessory data, stored historical accessory data, present and/or predicted accessory states, and/or other sources.

Sub-process 546, which compares the risk of lost regeneration of power versus the disruption that early start of an accessory will cause, can use the estimated time to drain the energy storage device determined in sub-process 544, the estimated time until the next regenerative power event of sub-process 542, and other information used to determine the relative weighting of each determination made by sub-processes 542 and 544.

In one embodiment, a cost function is established using values for estimated reduction in regeneration capacity, the cost per reduction in capacity, the estimated loss in useful energy and the cost of the loss of useful energy. The estimated reduction in regeneration capacity is the reduction due to remaining capacity in energy storage device 304. The cost per reduction in capacity is the cost associated with a reduction in fuel economy of vehicle 10 due to reduced capacity of energy storage device 304. This cost is, in turn, dependent on a probability that an incremental capacity will be required during the next regenerative power event. The estimated loss in useful energy is the loss due to moving energy between energy storage devices 302 and 304. In such case, the loss is dependent on the efficiency of converting energy between energy storage devices 302 and 304. Ultimately, these considerations are used to guarantee required functions of the vehicle, and to maximize the fuel economy of the vehicle beyond that.

The cost function is used to create a cost model in which each of the above cost function value is linked to the estimates of time to drain energy storage device 304, the predicted time until when the next stop will likely occur and the estimate of remaining capacity of energy storage device 304 at any given time. The actual power setting for each energy storage device 302 and 304 is determined by optimizing against the above described cost function, depending on actual values for capacity reduction, loss of useful energy and their respective relative costs.

Still referring to FIG. 8, based on the result from sub-process 546, at Step 50, control unit 308 is configured to determine whether the risk of losing regeneration power is higher than the cost of the inefficiency of passing electrical energy from energy storage device 304 to energy storage device 302 at the time of the decision.

If the risk of losing regeneration power is not too high, i.e. not higher than a preselected level of risk, then at Step 52, control unit 308 sets the transfer rate between high power energy storage device 304 and high energy storage device 302 to zero, indicating that the energy from high power energy storage device 304 is not selectively passed to high energy storage device 302.

If the determination at Step 50 is affirmative, then at Step 60, energy is passed from the high power storage device 304 to high energy storage device 302 to lower the electrical energy on high power storage device 304. Then, control unit 308 is configured to repeat the process, at Step 52, as described above.

The actual power setting for each of storage devices 302 and 304 can be determined by optimizing against the cost function determined as described above. This will depend on actual values for the capacity reduction, loss in useful energy, disruption, as described above and their relative costs. Also, an optimization method may be used to maximize the "goodness" of the solution against the requirement and considerations discussed above. The process is based on the optimized solution which is implemented by control unit 308.

Figure 9:
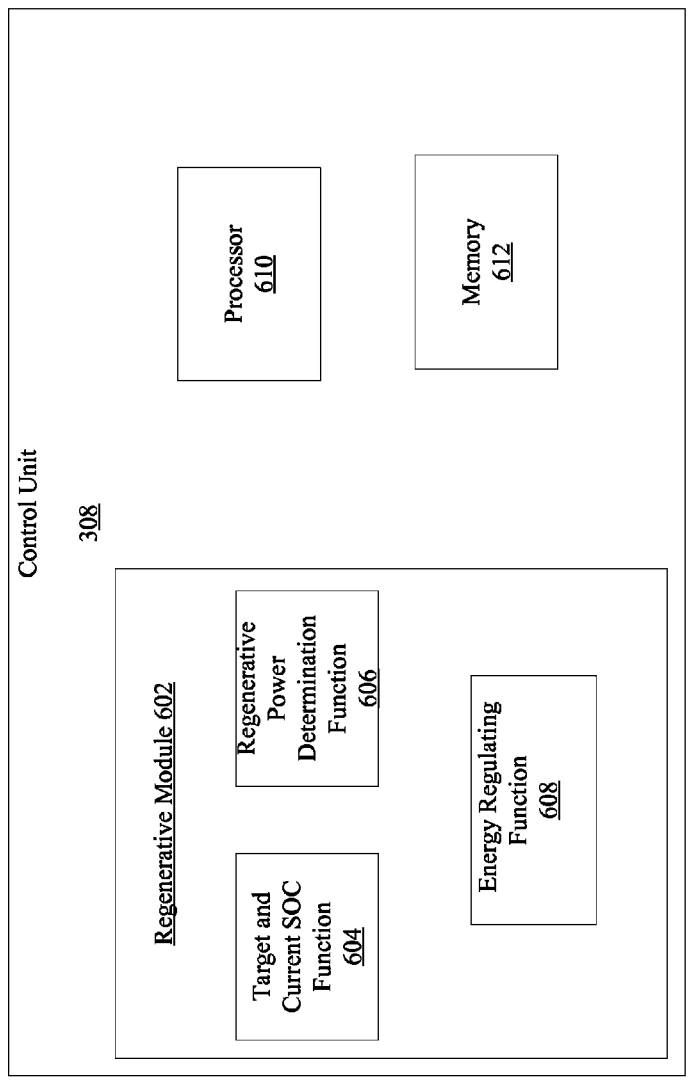
FIG. 9 is a block diagram illustrating components of a control unit associated with the energy storage system.
Figure 10:
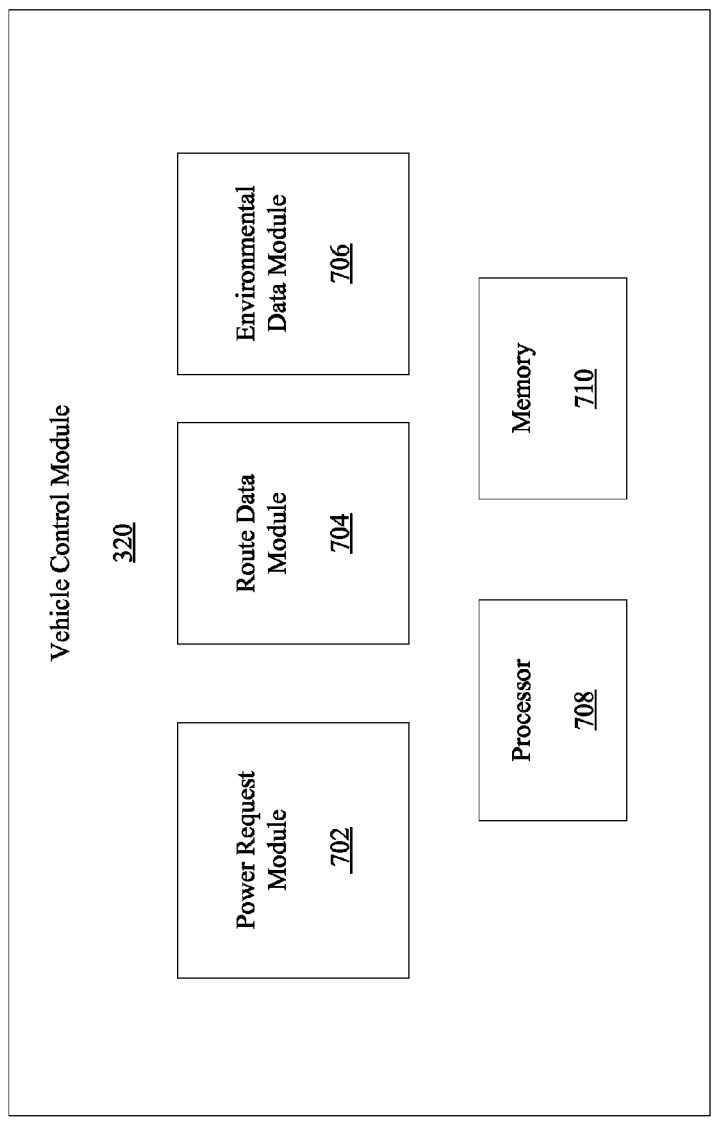
FIG. 10 is a block diagram illustrating components of a vehicle monitoring unit.

As shown in FIG. 9, control unit 308 includes a regenerative module 602, which in turn includes a target and current SOC function 604, a regenerative power determination function 606, an energy regulating function 608, a processing unit 610, and a memory unit 612 coupled to processing unit 610. Further, as shown in FIG. 10, vehicle monitoring unit 320 includes a power request module 702, a route data module 704, an environmental data module 706, a processing unit 708, and a memory unit 710 coupled to processing unit 708.

Each of processing units 610 and 708 can be implemented on a single-chip, multiple chips or multiple electrical components. For example, various architectures can be used including dedicated or embedded processor or microprocessor (µP), single purpose processor, controller or a microcontroller (µC), digital signal processor (DSP), or any combination thereof. In most cases, each of processing units 610 and 708 together with an operating system operates to execute computer code and produce and use data. Each of memory units 612 and 710 may be of any type of memory now known or later developed including but not limited to volatile memory (such as RAM), non-volatile memory (such as ROM, flash memory, etc.) or any combination thereof, which may store software that can be accessed and executed by processing units 610 and 708, respectively, for example.

Figure 11:
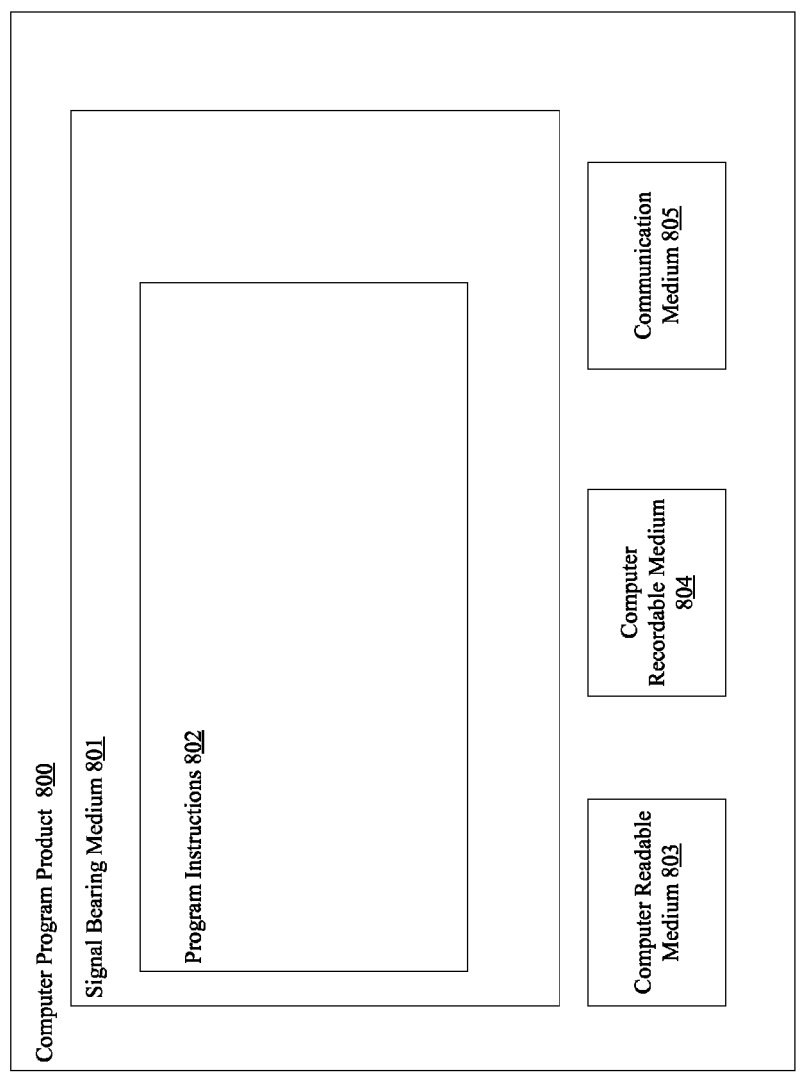
FIG. 11 is a schematic diagram illustrating a conceptual partial view of an example computer program product.

In some embodiments, the disclosed method may be implemented as computer program instructions encoded on a computer-readable storage media in a machine-readable format. FIG. 11 is a schematic illustrating a conceptual partial view of an example computer program product 800 that includes a computer program for executing a computer process on a computing device, arranged according to at least some embodiments presented herein. In one embodiment, the example computer program product 800 is provided using a signal bearing medium 801. The signal bearing medium 801 may include one or more programming instructions 802 that, when executed by a processing unit, may provide functionality or portions of the functionality described above with respect to FIGS. 1-8. Thus, for example, referring to the embodiment shown in FIG. 8, one or more of the features of the described Steps, may be undertaken by one or more instructions associated with the signal bearing medium 801.

In some examples, signal bearing medium 801 may encompass a non-transitory computer-readable medium 803, such as, but not limited to, a hard disk drive, memory, etc. In some implementations, the signal bearing medium 801 may encompass a computer recordable medium 804, such as, but not limited to, memory, read/write (R/W) CDs, R/W DVDs, etc. In some implementations, signal bearing medium 801 may encompass a communications medium 805, such as, but not limited to, a digital and/or an analog communication medium (e.g., a fiber optic cable, a waveguide, a wired communications link, etc.).

It should also be appreciated that while the energy storage devices have been referenced as being high energy or high power, the present disclosure contemplates that the two energy storage devices may be of the same kind, type and size, and that storage devices other than the ones indicated here may also be successfully employed with the present disclosure. Also, while only two energy storage devices have been shown in the embodiment described above, more than two energy storage devices could be employed.

One or more of the disclosed embodiments, alone or in combination, may provide one or more technical effects useful in optimizing the storing of vehicular energy of xEVs. The technical effects and technical problems in the specification are exemplary and are not limiting. It should be noted that the embodiments described in the specification may have other technical effects and can solve other technical problems. 2

While only certain features and embodiments of the disclosure have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the exemplary embodiments, all features of an actual implementation may not have been described (i.e., those unrelated to the presently contemplated best mode of carrying out embodiments of the present disclosure).

What is claimed is:

1. A system for storing electrically a regenerative energy of a vehicle, comprising:
   a first energy storage device;
   a second energy storage device;
   an energy regulating device coupled to the first and second energy storage devices;
   a source of regenerative power for capturing regenerative energy during a regenerative power event of the vehicle; and
   a control unit coupled to the energy regulating device, wherein the control unit is configured to:
      transfer electrical energy from the first energy storage device to the second energy storage device based on a prediction of the regenerative power event using the energy regulating device; and
      compare a cost of losing regenerative energy because of a failure to timely transfer electrical energy, and a cost of lost transfer energy due to inefficiencies in passing energy from the first energy storage device to the second energy storage device;
   wherein the transfer of the electrical energy serves to reduce the electrical energy stored in the first energy storage device thereby enabling the first energy storage device to receive from the regenerative power device when the predicted regenerative power event occurs an amount of the electrical regenerative energy.

2. The system of claim 1, wherein the control unit is programmed to make a prediction of a time window when the next regenerative power event will likely occur.

3. The system of claim 2, wherein the prediction is based on at least one of a statistical driving model, a detected type of driving style including speed and acceleration, stored driving data from prior trips of the vehicle, stored energy data, and routing information.

4. The system of claim 2, wherein the control unit determines to pass on the electrical energy transfer based at least in part on an estimate of how quickly accessory load current can lower the SOC of the first energy storage device.

5. The system of claim 4, wherein the estimate is based at least in part on at least one of:
- a prior history of accessory usage over multiple time scales;
- a stored history of accessory usage during trips prior to the current trip;
- a history of accessory usage during a time interval of a current trip of the vehicle;
- a current state of the vehicle during the current trip including at least one of vehicular speed and acceleration; and
- route information of the current trip.

6. The system of claim 5, wherein the estimate is further based at least in part on at least one of:
- data collected from vehicle regarding prior, present, predicted accessory data, or any combination thereof; and
- data collected from accessories regarding prior, present, predicted accessory data, or any combination thereof.

7. The system of claim 1, wherein the control unit is configured to use the information to make predictions related to:
- a time window when the next regenerative power event will likely occur,
- how quickly a normal vehicle operation may drain the first energy storage device,
- how likely the regenerating energy may be lost due to the first storage device having more than an optimum amount of electrical energy at the time of the next regenerative power event, and
- how much energy may be lost due to inefficiencies in transferring energy from the first energy storage device to the second energy storage energy device; and
- wherein the control unit makes a decision based on at least one of these predictions as to whether electrical energy should be transferred from the first energy device to the second energy storage device.

8. The system of claim 1, wherein the first energy storage device is a relatively high power storage device and the second energy storage device compared to the first energy storage device is a relatively high energy storage device.

9. The system of claim 1, further comprising:
- a device for transferring energy from the first energy storage device back to wheels of the vehicle to provide propulsion power to the vehicle.

10. The system of claim 1, wherein the source of regenerative power is one of a generator, an alternator, a motor, or any combination thereof.

11. A computer-implemented method of reducing loss of regenerative energy in a vehicle by controlling energy storage devices that power the vehicle, comprising:
- predicting when a next regenerative power event during a current trip will occur;
- estimating when a first energy storage device connected for receipt of regenerative energy will be in an optimum condition to receive regenerative energy;
- transferring electrical energy from the first energy storage device to a second energy storage device to reduce the loss of regenerative power due to the first energy storage device having a greater than an amount of stored electrical energy suitable to accept regenerative energy during the predicted regenerative power event; and
- terminating the transferring of electrical energy from the first energy storage system to the second energy storage device when the first energy storage device has no greater amount than the suitable amount of stored electrical energy.

12. The computer-implemented method of claim 11, wherein automatically estimating is based upon at least one of:
- a prior history of accessory usage over multiple time scales;
- a stored history of accessory usage during trips prior to the current trip;
- a history of accessory usage during a time interval of a current trip of the vehicle;
- a current state of the vehicle during the current trip including at least one of vehicular speed and acceleration; and
- route information of the current trip.

13. The computer-implemented method of claim 12, wherein automatically estimating is further based upon at least one of:
- data collected from vehicle regarding prior, present, predicted accessory data, or any combination thereof; and
- data collected from accessories regarding prior, present, predicted accessory data, or any combination thereof.

14. The computer-implemented method of claim 11, further comprising:
- estimating a time needed to lower an SOC of at least one of the first and second energy storage devices to a suitable level for receipt of regenerative energy; and
- comparing a risk of losing regenerative energy based on the estimated time to the next predicted regenerative power event and on the estimated time needed to lower the SOC of the at least one of the first and second energy storage devices.

15. The computer-implemented method of claim 11, wherein energy transferring is performed only if a risk of losing regenerative energy is greater than a preselected level of disruption of a normal operation of the vehicle.

16. The computer-implemented method of claim 11, wherein energy transferring is performed only if a loss of regenerative energy because of a failure to transfer energy is greater than efficiency lost from transferring energy from the first energy storage device to the second energy storage device.

17. The computer-implemented method of claim 11, wherein the first energy storage device is a high power storage device, and the second energy storage device is a high energy storage device.

18. A computing system, comprising:
- at least one processing unit and at least one memory unit storing instructions that are operable, when executed by the at least one processing unit, to cause the at least one processing unit to perform a method for reducing loss of power from a regenerative source of power that is provided during regenerative power events, the method comprising:
  - predicting when a next regenerative power event during a current trip will occur;
  - estimating when a first energy storage device connected for receipt of regenerative energy will be in an optimum condition to receive regenerative energy; and
  - transferring electrical energy from the first energy storage device to a second energy storage device to reduce the loss of regenerative power due to the first energy storage device having a greater than an amount of stored electrical energy suitable to accept regenerative energy during the predicted regenerative power event, wherein energy transferring is performed only if a loss of regenerative energy because of a failure to transfer energy is greater than efficiency lost from transferring energy from the first energy storage device to the second energy storage device.

19. The computing system of claim 18, wherein automatically estimating is based upon at least one of:

a prior history of accessory usage over multiple time scales;

a stored history of accessory usage during trips prior to the current trip;

a history of accessory usage during a time interval of a current trip of the vehicle;

a current state of the vehicle during the current trip including at least one of vehicular speed and acceleration; and route information of the current trip.

20. The computing system of claim 18, wherein automatically estimating is further based upon at least one of:

data collected from vehicle regarding prior, present, predicted accessory data, or any combination thereof; and data collected from accessories regarding prior, present, predicted accessory data, or any combination thereof.

21. The computing system of claim 18, further comprising:

terminating the transferring of electrical energy from the first energy storage system to the second energy storage device when the first energy storage device has no greater amount than the suitable amount of stored electrical energy.

22. The computing system of claim 18, further comprising:

estimating a time needed to lower an SOC of at least one of the first and second energy storage devices to a suitable level for receipt of regenerative energy; and comparing a risk of losing regenerative energy based on the estimated time to the next predicted regenerative power event and on the estimated time needed to lower the SOC of the at least one of the first and second energy storage devices.

23. The computing system of claim 18, wherein energy transferring is performed only if a risk of losing regenerative energy is greater than a preselected level of disruption of a normal operation of the vehicle.

24. The computing system of claim 18, wherein the first energy storage device is a high power storage device, and the second energy storage device is a high energy storage device.

* * * * *